United States Patent [19]

Haus

[11] Patent Number: 4,786,950
[45] Date of Patent: Nov. 22, 1988

[54] DEVICE FOR INSERTING COPY... MATERIAL

[76] Inventor: Hans Haus, Hahlgartenweg 7, D-6250 Limburg, Fed. Rep. of Germany

[21] Appl. No.: 72,260
[22] PCT Filed: Oct. 27, 1986
[86] PCT No.: PCT/DE86/00433
§ 371 Date: Jun. 22, 1987
§ 102(e) Date: Jun. 22, 1987
[87] PCT Pub. No.: WO87/02788
PCT Pub. Date: May 7, 1987

[30] Foreign Application Priority Data

Oct. 26, 1985 [DE] Fed. Rep. of Germany ....... 3538192

[51] Int. Cl.⁴ .............................................. G03B 27/08
[52] U.S. Cl. ................................................... 355/99
[58] Field of Search ................... 355/50, 85, 99, 100, 355/103

[56] References Cited

U.S. PATENT DOCUMENTS

| | | | |
|---|---|---|---|
| 1,682,979 | 9/1928 | Oiler | 355/103 |
| 2,654,300 | 10/1953 | Baker | 355/103 |
| 3,547,536 | 12/1970 | Phleps et al. | 355/50 |
| 3,771,871 | 11/1973 | Rattman | 355/103 X |
| 3,814,519 | 6/1974 | Zevnen et al. | 355/103 |
| 4,281,922 | 8/1981 | Matsumoto | 355/99 |
| 4,423,955 | 1/1984 | Powers | 355/99 |

FOREIGN PATENT DOCUMENTS 3220637 12/1983 Fed. Rep. of Germany .
1162768 8/1969 United Kingdom .

Primary Examiner—Donald A. Griffin

[57] ABSTRACT

A device for inserting copier web materials and exposure web materials into an apparatus for the continuous exposure of this material. The web materials are moved by means of a belt conveyor (9) through an entry slit, formed by a pair of drive rolls (15, 16), through an exposure chamber (B) with a transparent plate (4), and finally are conducted to another pair of drive rolls (10, 13) disposed behind the exposure chamber (B). From there, they are brought into the region of a separation device (30), which separates the webs of the web material from one another. The web materials have positioning holes that can be aligned with one another. The register pins (26) can be inserted into or brought out from these holes. The register pins (26) are disposed on lifting devices (MZ) between the entry slit and the exposure chamber (B). The drive roll (16), which is one of the drive rolls forming the entry slit, is designed so that can be lifted away from the web material; the other drive roll (15) is mounted permanently.

7 Claims, 2 Drawing Sheets

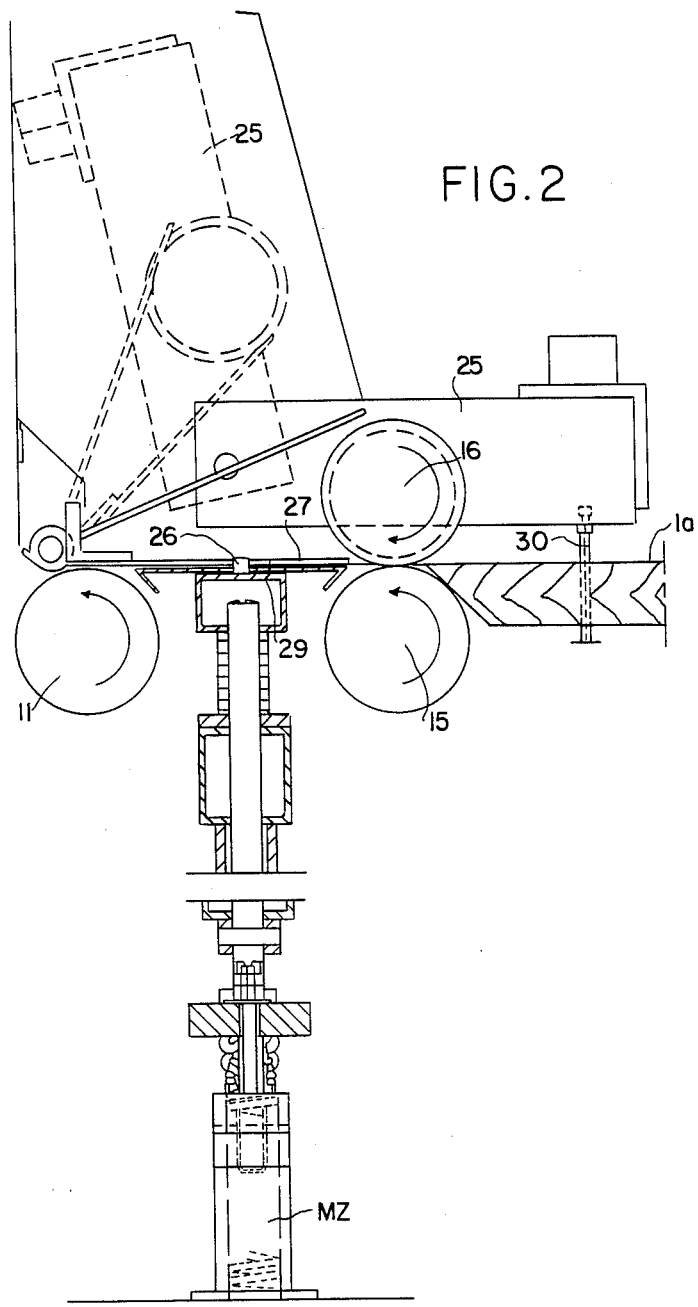

DEVICE FOR INSERTING COPY ... MATERIAL

A Device for inserting copier web material and exposure web material into an apparatus for the continuous exposure of this material, Here, the web materials are moved by means of a belt conveyor through an entry slit that is formed by a pair of drive rollers, and through an exposure chamber with a transparent plate, to another pair of drive rollers disposed behind the exposure chamber, and from there to a separation device which separates the webs from one another. The web materials have positioning holes which can be mutually aligned. Register pins can be inserted and withdrawn from these holes by means of a lifting device.

In a known device of this type (DE-OS No. 32 20 637), the register pins are disposed on a support plate before the entry slit that is formed by a drive roll and by a deflection roll of the belt conveyor. The support plate can be moved in the direction of motion of the web materials in a straight line back and forth with respect to this entry slit. It has a support surface for the web materials. A lifting device is disposed on the support plate, and it seizes from below the web materials that are lying on the support surface. By means of this lifting device, the web material can be raised above the protruding height of the register pins.

The exposure web material, for example, contains a printing plate. With this device, it is manually placed on the support surface of the support plate, in such a fashion that the register pins are inserted into the positioning holes, and the individual webs of the web material are fixed in position in this fashion. The support plate, together with the web material that is lying on its support surface, is then moved in the direction of the entry slit until the drive rolls—which belong to the pair of drive rolls forming the entry slit—material. After the pair of drive rolls has moved the web material over a prescribed distance, for example, 5 to 10 cm, the web material is lifted by means of the lifting device, which seizes it from below, to such an extent that the register pins are no longer situated within the positioning holes and the web material can then be moved further by the drive rolls in the direction towards the exposure chamber. At the same time, the support plate is pushed back into its initial position, so as to be ready for insertion of the next web material.

The disadvantage of this device is that the parts of the web material in this device must be fixed in position in the region of the rearward edge, i.e., the edge turned away from the entry slit. The reason for this is that only in this way is it possible to raise the web material by means of the lifting device and, after the front edge of the web material has been seized by the pair of drive rollers, to remove the web material from the region of the register pins. Fixing the position in the region of the rearward edge entails slight transverse displacements of parts of the web material with respect to one another when its forward edge enters into the entry slit. Thus the dimensional precision required for copying is not guaranteed. It is particularly difficult to work with the known device when the originals being copied have slight corrugations in their surface. Consequently, working with the device requires experience and care in the insertion of the web material and in the advance of the support plate. The rather large amount of time expended in this connection impairs the output. Practically the same difficulties occur with another embodiment of the device, in which the register pins on the support plate are connected with lifting devices which make it possible to lower the pins below the support surface for the web materials. In this embodiment, the web materials indeed need not be raised above the protrusion height of the register pins; the arrangement of the register pins, however, here too is possible only in the rearward section, in some cases also in the central section, of the length of the web material, since the running plate also requires room for motion in the direction towards the entry slit.

The invention is based on the aim of redesigning and improving this known device so that the above disadvantages are avoided and the output is increased.

This aim is achieved as follows: The register pins with their lifting devices are disposed permanently in the region of motion of the web material between the pair of drive rollers forming the entry slit and the exposure chamber. Here, one of the drive rolls of the pair is designed so that it can be lifted away from the web material, the other drive roll is mounted permanently. The removable drive roller can here be mounted in a support that is pivotable about an axle that lies crosswise to the direction of motion of the exposure material. A pressure plate for the web material can be disposed at this support.

Spring elements can be disposed between the pressure plate and the support, or the pressure plate can be designed as a spring plate. According to the invention, a sensing switch for the lifting drive of the register pins can be disposed in the pivoting path of the support of the drive roll. Other suitable developments of the device are specified in the subclaims.

The invention is elucidated in more detail by way of the embodiment shown in the drawing. The drawings show the following:

FIG. 2 shows a detail, likewise in longitudinal section, and viewed from the side in a magnified scale.

Figure 1:
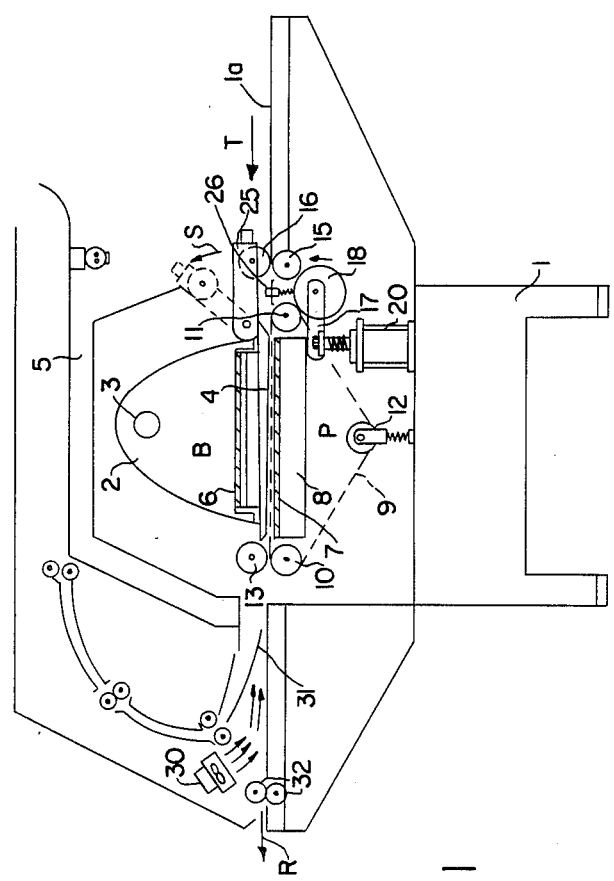
FIG. 1 shows the device in longitudinal section as seen from the side, in a schematic representation.

As can be seen from FIG. 1, the device contains a support table 1. A hood 2 to blank out light, with the light source 3 and the light-transparent plate 4, are disposed in a support frame 5 above the support surface 1a of said support table. A grating 6 to generate directed light is disposed above the transparent plate 4 in the hood 2, but this is not part of the invention. A pressure support plate 8 is disposed below the transparent plate 4 and the level of the support surface 1a. It is coated with an elastic material 7, and can be raised in the direction of the drawn-in arrow P. The endless belt conveyor 9 is moved between the transparent plate 4 and the pressure support plate 8; before and behind the exposure chamber B, which is formed by the hood 2 and the transparent plate 4, it has deflection rolls 10 and 11 as well as a tension roll 12. The deflection roll 10 is situated in the transport direction T behind the transparent plate 4. Together with a roll 13 that lies upon it, it forms the exit slit. It is friction-driven by the roll 10 and, together with the latter, acts as a pair of drive rolls. The register pins 26 are disposed before the exposure chamber B and before the deflection roll 11. In a fashion that is not shown here, the register pins 26 can be lowered from the position that is drawn here, where they protrude from the support surface 1a, into a position below this support surface 1a. Another pair of drive rolls 15, 16 is disposed ahead of these register pins 26 in the transport direction T. The lower drive roll 15 of the pair of drive rolls is mounted permanently below the support surface 1a. In the position drawn here, it is driven by the deflection roll 11 of the belt conveyor 9 through an intermediate friction roll 18, which is mounted in a rocker lever 17. It can be switched off from the drive by the lifting magnet 20, which brings the intermediate friction roll in and out of its active position. The upper drive roll 16 (compare also FIG. 2) is mounted in a support 25. The support 25 can be swung in the direction of the drawn arrow S into the position shown by dashed lines. Here, the drive roll 16 is swung away from the support surface 1a. A pressure plate 27 is connected with the support 25. When the drive roll 16 is lying on the support surface 1a, the pressure plate 27 likewise comes to rest on this support surface 1a. The register pins 26 are disposed on a transverse cross-bar 29 in such a fashion that they can be inserted into the positioning holes, which are provided at the two longitudinal sides of the (not shown) web material. The cross-bar 29 is supported by a magnetic pole device MZ which is not part of the invention. The contact-maker 30, as a sensing switch, extends from the support surface 1a and belongs to a (not shown) switching device. By the support 25 it is brought from the position shown in dashed lines into the position shown by solid lines, when the support 25 has reached the drawn position (in solid lines), and the drive roll 16 lies on the support surface 1a or the web material.

The device works in the following fashion: When the support 25 is swung up, and when the register pins 26 are in the upper position, the web material is placed on the support surface 1a in such a fashion that the register pins 26 are situated in the positioning holes. Then the support 25 is swung downwards into the position shown in solid lines. Here, the pressure plate 27 and the drive roll 16 lie against the web material and thus fix the relative position of those parts which form the web material. Then the register pins 26 are moved downwards from the positioning holes below the support surface 1a. Only then is the lower drive roll 15 caused to rotate through the intermediate friction roll 18 by activating the lifting magnet 20.* Together with the drive roll 16 which makes contact with it, it then transports the web material—which is pressed against the support surface 1a by the pressure plate 27—into the exposure chamber B underneath the transparent plate 4. During this transport step, the parts of the web material practically cannot move transversely with respect to one another since the web material, before leaving the pair of drive rolls 15, 16 has already been seized by the conveyor belt 9. Here it is conducted between the pressure support plate 8 and the transparent plate 4 in such a fashion that the parts of the web material cannot move transversely. The drive of the drive rolls 15, 16, via the intermediate friction roll 18, through the deflection roll 11 of the belt conveyor 7, assures that the transport motion occurs sychronously.

*The following translation would also be grammatically correct: Only then is the lower drive roll 15 caused to rotate by activating the lifting magnet 20 through the intemediate friction roll 18.

The drive rolls 15, 16 not only cause the parts of the web material to be transported in the direction towards the exposure chamber B, secure against transverse displacements, but they also roll out possible air bubbles, folds, or other non-uniformities from the form (original film) before these can reach the exposure chamber B.

The individual motions within the device are suitably controlled by means of switching elements which are not part of the invention, such as microswitches, electronic switch delay devices, and the like. Thus, the pressure plate 27 first fixes the web material in its position, then the drive roll 16 in conjunction with the drive roll 15 fixes it in position, and finally the register pins 26 are moved out of the positioning holes. Then the lifting magnet 20 is activated, which causes the drive motion of the drive roll 15. The support 25, which supports the drive roll 16, can here be brought automatically into the upper swivel position, as soon as the rearward end of the web material enters the exposure chamber B. In this way, the next web material can be positioned as rapidly as possible and can be transported in the manner already described.

The parts of the web material leaving the exposure chamber B, for example the printing plate and the form, are separated by means of a separation device which likewise is not part of the invention. Here the separation device is equipped with a blower device 30 (compare FIG. 1), whose jet is applied to the forward edge of the web material as it leaves the exit slit formed by the deflection rolls 10 and the roll 13. The effect of this is that the form is deflected upwards and reaches a deflection guide 31; the plate is seized by a pair of drive rolls 32, and is transported away in the direction of the arrow R.

I claim:

1. A device for inserting copier web material and exposure web material into an apparatus for continuously exposing this material; here the web materials are moved by means of a belt conveyor through an entry slit formed by a pair of drive rolls, through an exposure chamber with a transparent plate, to another pair of drive rolls disposed behind the exposure chamber, and from there are conducted to a separation device which separates the webs from one another; the web materials have positioning holes that can be aligned with one another; register pins can be inserted into or withdrawn from these positioning holes by means of a lifting device; it is characterized as follows: the register pins (26), together with their lifting devices (MZ) are disposed fixed between the pair of drive rolls (15, 16) which forms the entry slit or the exposure chamber (B); here, one of the drive rolls (16) of the pair of drive rolls (15, 16) is designed so that it can be lifted away from the web material, while the other drive roll (15) is mounted permanently.

2. A device according to claim 1, characterized as follows: The drive roll (16) which can be lifted away is mounted in a support (25) which is pivotable about an axis that lies transverse to the transport direction of the web materials.

3. A device according to claim 2, characterized by a pressure plate (27), which can be placed on the web material, being disposed at the support (25).

4. A device according to claim 3, characterized by spring elements being disposed between the support (25) and the pressure plate (27).

5. A device according to claim 3, characterized by the pressure plate (27) being designed as a spring plate.

6. A device according to anyone of claims 2 through 5, characterized by a sensing switch (30) for the lifting drive (MZ) of the register pins (26) being disposed in the swivel path of the support (25) of the drive roll (16).

7. A device according to anyone of claims 1 through 6, with a belt conveyor, one of whose deflection rolls is disposed before the transparent plate of the exposure chamber, characterized as follows: an intermediate friction roll (18) is disposed between one drive roll (15) of the pair of drive rolls (15, 16) which form the entry slit on the one hand and a deflection roll (11) of the belt conveyor (9) on the other hand, where said intermediate friction roll (18) can be brought into and out of the drive transfer position by means of a lifting magnet.

* * * * *